United States Patent
Rolland et al.

(10) Patent No.: US 8,409,545 B2
(45) Date of Patent: Apr. 2, 2013

(54) METHOD FOR PRODUCING A PURIFIED SYNTHESIS GAS FROM A BIOMASS INCLUDING A PURIFICATION STEP UPSTREAM FROM THE PARTIAL OXIDATION

(75) Inventors: Matthieu Rolland, Vernaison (FR); Eric Lemarie, Anse (FR); Nicolas Boudet, Chaponost (FR); Jean-Marie Seiler, Seyssins (FR); Sylvie Rouge, Brie-et-Angonnes (FR)

(73) Assignees: IFP Energies nouvelles, Rueil-Malmaison Cedex (FR); Commissariat a l'Energie Atomique, Grenoble (FR)

( * ) Notice: Subject to any disclaimer, the term of this patent is extended or adjusted under 35 U.S.C. 154(b) by 443 days.

(21) Appl. No.: 12/524,510

(22) PCT Filed: Dec. 17, 2007

(86) PCT No.: PCT/FR2007/002105
§ 371 (c)(1),
(2), (4) Date: May 17, 2010

(87) PCT Pub. No.: WO2008/093012
PCT Pub. Date: Aug. 7, 2008

(65) Prior Publication Data
US 2010/0237290 A1 Sep. 23, 2010

(30) Foreign Application Priority Data
Dec. 22, 2006 (FR) .................. 06 11411

(51) Int. Cl.
*C01B 3/24* (2006.01)

(52) U.S. Cl. .......... 423/650; 423/648.1; 252/373; 518/702

(58) Field of Classification Search .......... 423/648.1, 423/650; 252/373; 518/702
See application file for complete search history.

(56) References Cited

U.S. PATENT DOCUMENTS

| | | | | |
|---|---|---|---|---|
| 3,928,532 A * | 12/1975 | Squires | .......... | 423/210 |
| 4,364,745 A * | 12/1982 | Weil | .......... | 48/209 |
| 5,034,021 A * | 7/1991 | Richardson | .......... | 48/77 |
| 5,538,706 A * | 7/1996 | Kapoor et al. | .......... | 423/418.2 |
| 2003/0191199 A1* | 10/2003 | O'Rear | .......... | 518/705 |
| 2004/0265158 A1* | 12/2004 | Boyapati et al. | .......... | 417/572 |
| 2005/0245619 A1* | 11/2005 | Fenouil et al. | .......... | 518/702 |

* cited by examiner

*Primary Examiner* — Paul Wartalowicz
(74) *Attorney, Agent, or Firm* — Millen, White, Zelano & Branigan, P.C.

(57) ABSTRACT

The process that is the object of the invention describes a process whose purpose is to produce a purified synthesis gas from lignocellulosic biomass that includes a pyrolysis stage, a purification stage placed upstream from the partial oxidation stage, and a cooling stage.

12 Claims, 2 Drawing Sheets figure 1 figure 2

METHOD FOR PRODUCING A PURIFIED SYNTHESIS GAS FROM A BIOMASS INCLUDING A PURIFICATION STEP UPSTREAM FROM THE PARTIAL OXIDATION

FIELD OF THE INVENTION

This invention relates to a process for the production of purified synthesis gas from lignocellulosic biomass that comprises at least one pyrolysis stage, at least one partial oxidation stage, and at least one purification stage, whereby said purification stage is located downstream from the pyrolysis stage and upstream from the partial oxidation stage.

The synthesis gas that is produced according to the process of this invention does not contain any sulfur-containing impurity, all solid particles are removed therefrom, and it has an H2/CO molar ratio that is defined at the value that corresponds to the application under consideration.

In the case of an application to the Fischer-Tropsch synthesis for the purpose of producing liquid fuels, this H2/CO molar ratio lies in the interval 1.1 to 2.3. More generally, the synthesis gas that is obtained by the process according to this invention can have an H2/CO molar ratio with any value between 1.0 and 3.5, whereby the specific value depends on the subsequent application.

PRIOR ART

To emphasize the improvement provided by the process according to the invention, we will examine more particularly its impact on the conversion of biomass into liquid fuels by gasification, known by the term BTL chain. This chain is actually based on the series of the following stages:
  Preparation of the biomass for the purpose of its introduction into the gasification unit, whereby this stage comprises a mild heat treatment in the absence of air, generally called roasting, followed by a grinding of the solid part for the purpose of achieving the desired grain size at the input of the gasification unit,
  Gasification of the biomass with oxygen, and production of a synthesis gas that consists for the most part of carbon monoxide and hydrogen,
  Purification of this synthesis gas by a set of processes linked to the nature of impurities,
  Adjustment of the H2/CO ratio by the reaction for conversion of CO (called "shift conversion" and corresponding to the reaction scheme CO+H2O←→CO2+H2))
  Fischer-Tropsch synthesis (FT synthesis in abbreviated form),
  Hydrocracking of effluents of the FT synthesis for the purpose of maximizing the production of the gas-oil fraction.

In another process of the prior art, the biomass feedstock is sent into a pyrolysis unit under very severe conditions producing a gas effluent and a solid effluent, whereby the two effluents are then introduced into a gasification unit.

The patent application that is published under number FR 2 861 402 describes, for example, a BTL chain according to the prior art. Regarding the BTL chains of the prior art, the purification of the synthesis gas is therefore carried out downstream from the gasification unit, whereas in the process according to the invention, it is carried out upstream. This upstream positioning offers the primary advantage of reducing oxygen consumption since the impurities that are eliminated do not have to undergo said gasification.

Relative to a conventional BTL chain, the other advantages of this invention are as follows:
  The purification of the pyrolysis gas is carried out at an elevated temperature, which is favorable from the energy standpoint,
  The process in its entirety is simplified by a reduction in the unit stage number of the process,
  The technical difficulties and the associated costs due to the corrosiveness of the impurities affecting the refractory substances and metals of the equipment are considerably reduced,
  The risks of poisoning the catalyst used in the unit downstream from the gasification, for example an FT synthesis unit, are reduced in the event of failure of the purification units of the synthesis gas,
  The preliminary purification of the synthesis gas makes possible the use of equipment for the heat recovery, which is not possible in a BTL chain according to the prior art in which the cooling is necessarily carried out by mixing with water without any possibility of heat recovery,
  The pyrolysis gas is relatively rich in the element hydrogen, which could lead to a synthesis gas that has an H2/CO ratio that is better suited to a subsequent Fischer-Tropsch synthesis.

SUMMARY DESCRIPTION OF THE INVENTION

The invention relates to a process for the production of a synthesis gas that is purified with a controlled H2/CO molar ratio from lignocellulosic biomass, relying on the following series of stages:
  A) A severe pyrolysis stage at a temperature of between 500° C. and 900° C. and preferably between 750° C. and 850° C., producing a gas effluent that is sent to a purification stage, and a solid residue that concentrates the majority of the metal impurities, in particular the alkaline compounds, as well as a portion of the sulfur compounds,
  B) A stage for purification of the pyrolysis gas that consists essentially of a removal of dust from the gas and the capture of sulfur compounds on adsorbent compounds based on ZnO or Co—Mo,
  C) A partial oxidation stage that is carried out by contact of the feedstock that consists of purified gas obtained from stage B with oxygen at a purity level of more than 90%, at a reaction temperature of between 1000° C. and 1600° C., and under a pressure of between 2.5 MPa and 4 MPa, whereby said stage produces a synthesis gas that primarily consists of carbon monoxide and hydrogen in an H2/CO molar ratio of between 0.5 and 1.5 based on the type of feedstock that is used,
  D) A rapid cooling stage of the synthesis gas that is obtained from stage C at a temperature of between 300° C. and 500° C.

According to a first variant, the process according to the invention can also comprise a stage E for conversion of the carbon monoxide on a portion of the flow of synthesis gas of between 30% and 70%, making it possible to reach, after mixing with the flow that has not undergone carbon-monoxide conversion, an H2/CO molar ratio that corresponds to the subsequent use of the synthesis gas.

According to a second variant, in the partial oxidation stage C, the feedstock consists of the purified gas that is produced in stage B mixed with an additional hydrocarbon that has an H/C ratio that is greater than that of the biomass.

It is also possible to combine these two variants so as to adjust the H2/CO molar ratio.

The process according to this invention makes it possible to produce a purified synthesis gas, i.e., released from the impurities initially contained in the biomass feedstock, in particular the various solid impurities and a portion of the sulfur compounds.

This purified synthesis gas can be used as a feedstock of a Fischer-Tropsch synthesis unit for the purpose of producing liquid fuels, but also as a gas for the synthesis of ammonia or the synthesis of methanol, and even heavier alcohols, or the synthesis of DME (abbreviation of dimethyl ether).

SUMMARY DESCRIPTION OF THE FIGURES

Two preferred variants of the process according to the invention are presented in FIGS. 1 and 2; these variants are distinguished in particular by the presence or absence of a carbon-monoxide conversion unit.

DETAILED DESCRIPTION OF THE INVENTION:

This invention can be defined as a process for the production of a purified synthesis gas from biomass, the term purified meaning that this synthesis gas no longer contains any of the impurities that were initially present in the biomass feedstock.

The biomass feedstocks covered by this invention are lignocellulosic-type feedstocks such as wood or straw wastes. The lignocellulosic products are primarily formed by lignins and cellulose. The impurities that are contained in this type of lignocellulosic biomass feedstock are essentially solid impurities, in particular alkaline metals (Na, K), and sulfur compounds, as well as chlorine and nitrogen compounds.

All of the purification operations in a BTL chain according to the prior art are carried out on the gas that is obtained from the gasification before the introduction of the gas that is purified in the Fischer-Tropsch synthesis stage.

The object of this invention is to propose a process for the production of synthesis gas in which the purification is consolidated into a single stage, a so-called purification stage, placed upstream from the gasification stage, so that the synthesis gas that is obtained from the partial oxidation stage can be introduced directly into the Fischer-Tropsch synthesis stage after an optional adjustment of the H2/CO molar ratio that can be carried out in a carbon-monoxide conversion unit.

The innovation introduced by this invention therefore consists in carrying out partial oxidation by using as a feedstock a pyrolysis gas of purified biomass, i.e., a suitable feedstock that no longer contains any of the impurities cited above. A large portion of the impurities initially contained in the pyrolysis gas will be found attached to the pyrolysis solid (metals including alkaline compounds, and a portion of sulfur compounds, . . . ), and the pyrolysis gas treatment will be much simpler than that of the synthesis gas that is obtained from the gasification (syngas according to the English terminology) in a BTL chain according to the prior art.

According to a first variant, the invention relates to a process for the production of a purified synthesis gas from lignocellulosic biomass that has a controlled H2/CO molar ratio and that comprises the following stages:

A) A severe pyrolysis stage at a temperature of between 500° C. and 900° C. and preferably between 750° C. and 850° C., making it possible to produce a gas effluent that is sent to a purification stage, and a solid residue that concentrates the majority of the impurities, in particular the alkaline compounds, and a portion of the sulfur compounds, B) A stage for purification of the pyrolysis gas that is obtained from stage A that consists essentially of a removal of dust from the gas and the capture of sulfur compounds on adsorbent compounds based on ZnO or Co—Mo, C) A partial oxidation stage that is carried out by putting the purified gas that is obtained from stage B into contact with oxygen at a purity level of more than 90%, at a reaction temperature of between 1000° C. and 1600° C., and under a pressure of between 2.5 MPa and 4 MPa, whereby said stage produces a synthesis gas that primarily consists of carbon monoxide and hydrogen in an H2/CO molar ratio of between 0.5 and 1.5 based on the type of biomass feedstock that is used, D) A rapid cooling stage of the synthesis gas that is produced in stage C at a temperature of between 300° C. and 500° C., E) A stage for conversion of carbon monoxide that generally relates to a portion of the flow of synthesis gas, preferably between 30% and 70%, making it possible to attain—after mixing with the flow that has not undergone carbon-monoxide conversion—a synthesis gas that has an H2/CO molar ratio that corresponds to the subsequent use of the synthesis gas.

Thus, for example, it is possible to use the synthesis gas according to the invention:

a) For the FT hydrocarbon synthesis, the H2/CO molar ratio of the feedstock comprising the synthesis gas is generally between 1.1 and 1.3 on an iron-based catalyst, and generally between 2.0 and 2.3 on a cobalt-based catalyst.

b) For the synthesis of ammonia, which essentially requires hydrogen, the conversion of carbon monoxide (CO) into hydrogen (H2) is maximized, and the CO and the CO2 are generally integrally extracted from the flow.

c) For the synthesis of methanol or dimethyl ether, the H2/(CO+CO2) ratio of the feedstock that comprises the synthesis gas is generally between 1.7 and 2.3 with at most 10% of CO2.

The purified synthesis gas according to the invention can also be used by itself or mixed with natural gas for the production of electricity, for example using a gas turbine.

When mention is made hereinafter of the H2/CO molar ratio corresponding to the selected application, it is in terms of the values provided in the three preceding paragraphs a), b), and c).

According to a second variant, the process according to the invention is a process for the production of a purified synthesis gas from lignocellulosic biomass, having a controlled H2/CO molar ratio and comprising the following stages:

A) A severe pyrolysis stage at a temperature of between 500° C. and 900° C., and preferably between 750° C. and 850° C., making it possible to produce a gas effluent that is sent to a purification stage, and a solid residue that concentrates the majority of the impurities, in particular the alkaline compounds, and a portion of the sulfur compounds, B) A stage for purification of the pyrolysis gas that is obtained from stage A that consists essentially of a removal of dust from the gas and the capture of sulfur compounds on adsorbent compounds based on ZnO or Co—Mo, C) A partial oxidation stage that is carried out by putting the purified gas that is obtained from stage B into contact with oxygen at a purity level of more than 90%, but in this second variant, the feedstock of stage C consists of purified gas that is produced in stage B mixed with an additional hydrocarbon that has an H/C ratio that is more than that of the biomass feedstock, at a reaction temperature of between 1000° C. and 1600° C., and under a pressure of between 2.5 MPa and 4 MPa, whereby said stage produces a synthesis gas that primarily consists of carbon monoxide and hydrogen in an H2/CO molar ratio that corresponds to the selected application, D) A rapid cooling stage of the synthesis gas that is obtained from stage C at a temperature that corresponds to the selected application.

The primary advantages of the process according to the invention are as follows:

The reduction of the quantity of oxygen that is necessary to the gasification by partial oxidation, because the fuel impurities that are eliminated upstream are therefore no longer gasified.

The purification of the pyrolysis gas is carried out at an elevated temperature, which is favorable from the energy standpoint (lowering of oxygen costs for the gasifier).

The pyrolysis gas is relatively rich in the element hydrogen, which leads to a synthesis gas that has an H2/CO molar ratio that is particularly well suited to the FT synthesis stage. In the second variant of the process according to the invention, the stage for adjustment of the H2/CO ratio is no longer even necessary.

Stage for Preparation of the Biomass (Optional)

The preparation of the biomass generally consists of a drying that is carried out at a temperature of between 150° C. and 280° C., making it possible to reach a water content of the biomass to be treated of about 10% by weight.

The pretreatment can consist of a heat treatment that makes it possible to adjust the moisture level (by drying) and optionally to embrittle the biomass by a mild heat treatment, sometimes called roasting, in the absence of air, and a description of which can be found in the French Patent Application 06/07, 049, followed by a grinding that makes it possible to adjust the grain size to the desired value before the input into the pyrolysis furnace.

Pyrolysis Stage (Stage A)

The objective of the pyrolysis stage is to produce a gas from optionally pretreated biomass.

The state of the art on pyrolysis teaches that the gas yield is maximum with severe pyrolysis, i.e., very rapid heating of the biomass to temperatures on the order of 600° C.-800° C. carried out with contact time limited to several seconds, and even less than one second.

Severe pyrolysis is the process that is preferred within the scope of this invention; however, other types of pyrolysis can nevertheless be considered.

The fraction of biomass that is not volatilized by pyrolysis is found in the form of a solid that comprises primarily carbon (C) and hydrogen (H).

This solid also contains the majority of the impurities that are contained in the biomass feedstock, in particular the alkaline elements (such as potassium and sodium), the various solid particles such as ashes, and also a portion of the sulfur compounds.

The pyrolysis solid has an intermediate composition in terms of the C/H ratio between lignite, carbon and coke.

It can be upgraded, in terms of energy, as a fuel, and in particular it can be used as a fuel to provide a portion of the heat that is necessary to the pyrolysis stage.

The combustion of the pyrolysis solid in situ can also be used in the supply of boilers for production of the vapor that is necessary for the stage for production of synthesis gas (stage C) or for the production of utilities, in particular electricity, or else for providing at least in part the heat that is necessary to pyrolysis. These different uses of the pyrolysis solid as fuel are not developed, because they are considered as uses that are known to one skilled in the art.

The pyrolysis solid can, after treatment, be used as activated carbon for the purpose of application as adsorbent.

The heat that is necessary to the pyrolysis stage can also be provided by indirect heat exchange with the hot synthesis gas that is obtained from stage C described below. The advantage of this exchange is to allow the rapid cooling of the synthesis gas simultaneously. This exchange can be carried out in a double-wall furnace, such as the one that is used in the waste treatment process whose description is found in the patent EP 0686 686 B1, or via an intermediate coolant such as vapor, or via an inert solid such as sand.

The process according to this invention is not linked to a particular technology for carrying out the pyrolysis stage. The advantage of a purification of the gas that is obtained from the pyrolysis upstream from the subsequent stage for production of the synthesis gas (stage C) is considerable. Actually, in addition to the advantages that are already mentioned, it should be emphasized that in a conventional BTL chain, the impurities, in particular sulfur impurities, contained in the feedstock gas of the stage for the production of synthesis gas, are found entirely within the synthesis gas that is produced. Sulfur, however, is a poison of the catalysts that are used in the FT synthesis. In addition, the metal impurities, and in particular the alkalines that are contained in the feedstock gas, have a negative effect on the behavior of the refractory substances over time and on the corrosion of the metal equipment. The fact of eliminating the impurities that are contained in the feedstock gas upstream from the partial oxidation stage is therefore an important advantage.

Stage for Purification of the Pyrolysis Gas (Stage B):

The pyrolysis gas contains primarily the gas molecules that are obtained after pyrolysis, i.e., essentially small, more or less oxidized hydrocarbons, such as alkanes that can have up to 4 carbon atoms, alcohol, and acids. These various molecules lead to the production of hydrogen and carbon monoxide during the subsequent stage of production of synthesis gas.

The pyrolysis gas can also contain sulfur molecules (H2S and COS).

The sulfur compounds are known for being poisons of the POX catalyst. Guard beds that contain ZnO or Co—Mo will make it possible to bring down the concentrations to the required contents, i.e., less than 100 ppb by weight, and preferably less than 10 ppb by weight (the ppb unit means part per billion (1 billion=$10^9$)).

The pyrolysis gas also contains dust of various unburned particles, redeposited carbon particles, and rare flyash. This solid dust can be stopped by means of a combination of the following means:

Cyclones

Ceramic filter (according to the technology of candle filters or woven ceramic fibers) or metal filters Fixed bed for filtration in depth In the filtration operations, preferably several filters are used in parallel to ensure the continuity of service during backwashing and/or replacements.

Within the scope of this invention, the preferred scheme for carrying out the purification stage is first the separation of the dust, followed by the elimination of sulfur compounds on capture compounds based on ZnO or Co—Mo. In this way, the capture compounds are not obstructed by the dust of the process. However, in a variant of the process according to the invention, the capture compounds can also be used as a depth filter, and, in this case, are located downstream from one or more cyclone stages.

The capture of sulfur compounds during the stage for purification of the feedstock gas of the partial oxidation stage can therefore be carried out on capture compounds based on ZnO or Co—Mo that are used in the form of filtration beds.

The filtration is then carried out by passing the gas to be purified through one or more radial or axial reactors that are filled with solids in the form of balls or extrudates.

The gas diffuses inside the pores of the solids. The sulfur compounds are captured on the surface of the pores. After a period of use that depends on the concentrations of sulfur compounds and the volume of the bed, the capture compounds are saturated and replaced. The service life of the compounds is longer than 1 month, preferably 3 months.

These operations are generally carried out at an elevated temperature of between 300° C. and 800° C., which also makes possible a significant gain in the energy consumption (utilities and oxygen).

Among the advantages of the purification according to this invention, it is possible to cite the fact that a large portion of said impurities remains in the pyrolysis solid. This is the case in particular of alkaline compounds and a portion of sulfur compounds.

It is also possible to note that the purification of the pyrolysis gas is much simpler than that of the synthesis gas. The value of the resulting H2/CO molar ratio actually makes it possible optionally to eliminate the carbon-monoxide conversion reaction (Water Gas Shift reaction or WGS according to the English terminology).

A significant gain in oxygen consumption is also achieved during the partial oxidation stage to the extent that it is not necessary to oxidize the impurities concentrated on the carbon solid with a low hydrogen content.

Finally, the pyrolysis gas comes in already relatively hot at the input of the POX stage because of the purification that is carried out at an elevated temperature, typically between 500° C. and 800° C.

Partial Oxidation Stage of the Pyrolysis Gas (Stage C):

Partial oxidation (that will be called POX in the broad sense, even when this stage includes vapor reforming) is operated on a purified gas that is obtained from the pyrolysis stage that is described in the preceding paragraph.

The partial oxidation with oxygen optionally can be combined with vapor reforming.

The operating conditions of the POX stage within the framework of this invention are preferably:

Temperature of greater than 1200° C. to minimize the yield of methane, tars, and soot, Pressure of between 2.5 MPa and 4 MPa, so as to supply the FT synthesis reactor with the optimum pressure One essential aspect of the partial oxidation technologies is to carry out oxidation by minimizing and preferably eliminating the production of soot, which can be obtained by adding water and by an optimized design of the combustion chamber.

Whereby the pyrolysis gas consists of light molecules, generally having 1 to 4 carbon atoms, it is possible to use the different POX technologies that are available. The highest-performing ones allow a reduction in the oxygen consumption and make it possible to obtain a better H2/CO ratio by the optional use of water, namely Thermal POX in which the partial oxidation in the presence of oxygen is carried out at an elevated temperature, typically more than 1200° C.

Catalytic POX in which a catalyst makes it possible to promote the total conversion at a lower temperature (800-1000° C.)

ATR (Autothermal Reforming according to English terminology): in which the partial exothermic oxidation is combined with an endothermic vapor reforming "Compact Reformer" that it is possible to translate by compact reforming, unit in which the reaction is carried out in an exchanger that contains the catalyst.

The catalytic POX technologies require that the sulfur content of the feedstock gas is less than 50-100 ppb by weight, which generally involves the use of guard compounds (ZnO or Co—Mo).

This content is effectively reached within the framework of this invention by the use of the capture beds of the sulfur compounds described in the preceding paragraph, which therefore makes it possible to use the catalytic POX technologies.

Because of the presence of a larger quantity of hydrogen in the pyrolysis gas than in the biomass, the H2/CO molar ratio of the synthesis gas that is obtained from the POX is better suited to a Fischer-Tropsch synthesis. This molar ratio is generally more than 1 at the end of the POX, whereas it is between 0.5 and 0.8 for the gas that is obtained from a direct gasification of biomass.

If the H2/CO molar ratio is insufficient (whereby the optimum value depends for the most part on the type of catalyst that is used in the FT synthesis), two methods make it possible to adjust it:

The use of a so-called carbon-monoxide conversion unit (CO Shift) that converts carbon monoxide in the presence of water into a mixture of carbon dioxide and hydrogen. This is the method that is followed in the first variant of this process.

A co-gasification with a make-up gas that is richer in hydrogen without conversion of the carbon monoxide. This hydrogen-rich gas can be a light hydrocarbon (natural gas, LPG, . . . ) or a "bio-gas" that is obtained from fermentation, composting, or exhaust gas recovery. This is the method that is followed in the second variant of this process.

Rapid Cooling Stage of Synthesis Gas (Stage D):

At the output of the partial oxidation unit, the synthesis gas is to be cooled very quickly to stop the conversion reactions and to preserve the concentrations obtained at an elevated temperature. The rapid cooling system (referred to as "quench" in English terminology) is typically ensured by heat exchange in the form of production of high-pressure (HP) vapor or medium-pressure (MP) vapor, or by mixing with water (spray, bubbling . . . ).

In this invention, it is possible to cool the synthesis gas by indirect exchange with the biomass upstream from the pyrolysis stage. This exchange makes it possible both to cool the synthesis gas but also to heat the biomass to a temperature level of between 50° C. and 300° C. before its introduction into the pyrolysis unit.

To carry out this exchange, it is possible to use double-wall furnace technologies with use of an intermediate coolant medium in gaseous form (vapor, hot air) or liquid (molten salts) or else the mixing with a granular solid (fluidized-bed-type technologies):

In gaseous form, the coolant is heated or evaporated by heat exchange with the hot synthesis gas, and then it is sent into the outside shell of a double-wall rotary furnace, whereby the biomass is injected inside the rotary furnace. The coolant gas yields its heat to the biomass by conduction and radiation.

In liquid form, the coolant is heated by heat exchange with the hot synthesis gas, and then used as a heat source in an exchanger for heating the biomass. Molten salts (NaCl, KCl) should be used to remain liquid at these temperatures.

In solid form, the coolant is an inert solid of a size of between 0.1 mm and 1 mm that is heated by mixing with a hot gas, or the synthesis gas itself, or preferably a gas that is heated by the synthesis gas. The solid and the hot gas are separated in a cyclone; the hot gas is then mixed with the biomass in a gas flow. The biomass heats upon contact with the solid and then is separated from the cooled solid that is sent to the heating section. The biomass/coolant solid separation is based on a difference of behavior in a gas flow linked to the difference in the densities of the solid particles.

In this case, the coolant solid particles are carried by the upward vertical gas flow, whereas the biomass particles for the most part remain at the bottom of the reactor. This technology is very close to that used in the FCC (Fluid Catalytic Cracking according to English terminology or fluidized-bed catalytic cracking).

Carbon-Monoxide Conversion Stage (Stage E):

This carbon-monoxide conversion stage generally relates to a portion of the flow of synthesis gas, preferably between 30% and 70% by volume. It makes it possible to attain—after mixing with the flow that has not undergone the carbon-monoxide conversion—a synthesis gas that has an H2/CO molar ratio that corresponds to the selected application.

Figure 1:
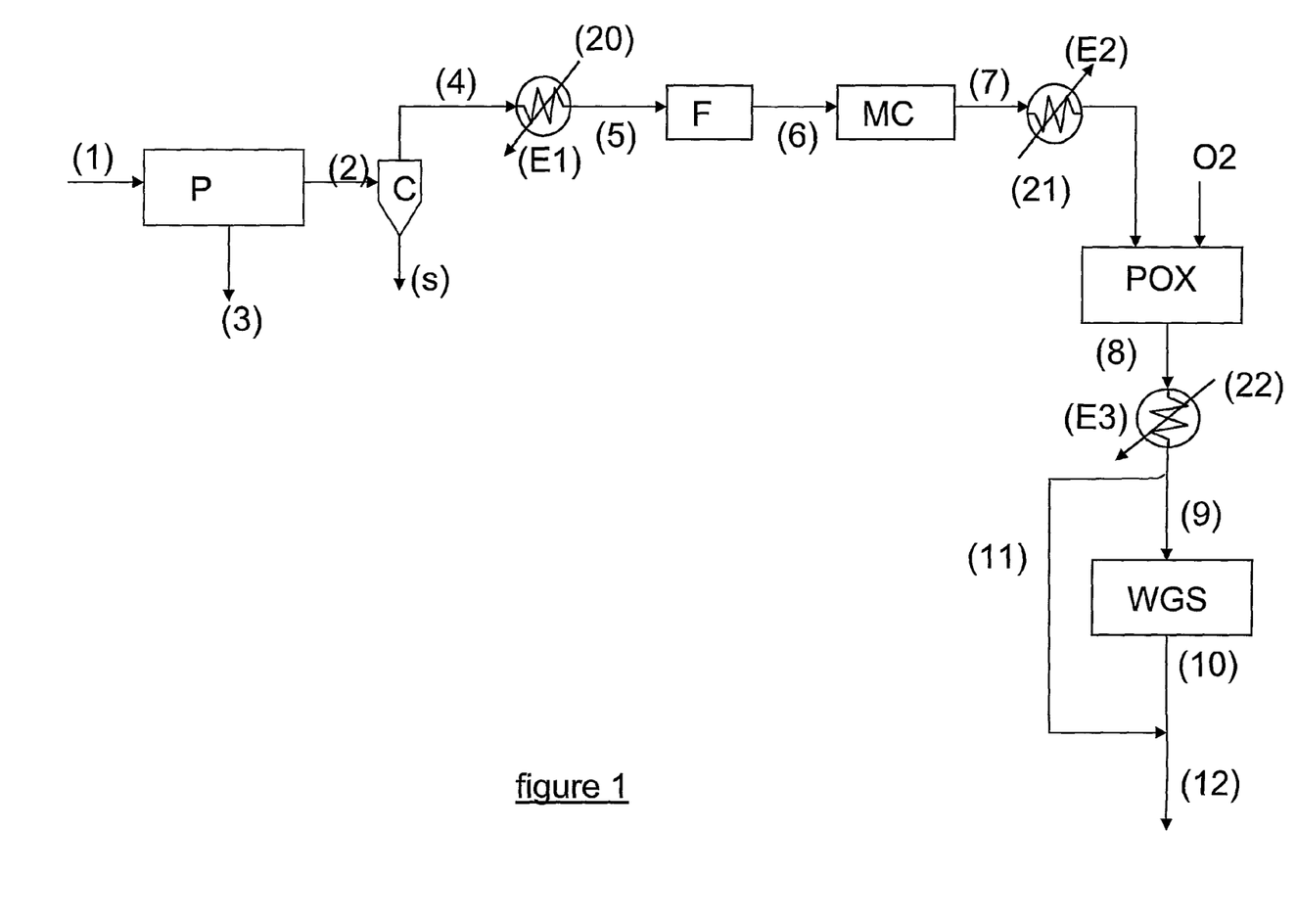
FIG. 1 describes an outline of the process according to a first preferred variant according to the invention. In this first variant, a conversion unit of CO is used to adjust the H2/CO ratio of the synthesis gas to the value that is suited to the Fischer-Tropsch synthesis, or to the synthesis of ammonia, or to the synthesis of methanol, according to the selected application.

First Variant Description of the Process According to the Invention (with Conversion of CO, FIG. 1):

The biomass feedstock (1) is assumed to be available with about 10% moisture. It is put under pressure by means of a standard technology (piston, airlock, rotary devices).

The biomass feedstock (1) is introduced into the pyrolysis furnace (P) at a temperature of between 700° C. and 900° C., preferably between 750° C. and 850° C., and under a pressure of about 3 MPa. Application of a pressure at 3 MPa can be carried out before pyrolysis, or preferably after pyrolysis by compression of the hot gases that are treated before their introduction into the synthesis gas production stage. The pyrolysis stage produces a gas effluent (2) that represents between 50% and 90% of the biomass that is introduced, and a solid residue (3) that represents the addition.

The gas effluent (2) that is loaded with solid particles is introduced into one or more cyclonic separation stages denoted (C) in FIG. 1.

The dedusted gas effluent (4) is cooled from 800° C. to 500° C. by an indirect exchange with the fluid (20) in an exchanger (E1).

The cooled and dedusted gas effluent (5) is filtered at 500° C., under a pressure of about 3 MPa on a ceramic filter (F), which makes it possible to reduce the content of solid particles in said gas effluent to less than 1 gram per m3, and preferably to less than 0.5 gram per m3 of gas.

The gas after filtration (6) is sent to capture compounds (MC) at 500° C., under 2.9 MPa so as to eliminate the sulfur compounds.

The dedusted and purified gas (7) is heated in an exchanger (E2) with a coolant (21).

The partial oxidation (POX) stage is carried out by putting the dedusted and purified pyrolysis gas (7) into contact with the oxygen that has a degree of purity that is more than 90% by volume (% by volume) and preferably more than 95% by volume, in a partial oxidation reactor.

The technology that is used for the oxidation reactor is not an element that is characteristic of this invention. It is possible, for example, to use a thermal or catalytic POX reactor.

The H2/CO molar ratio at the output of the POX reactor is between 0.5 and 1.3 according to the feedstock.

This ratio is to be the closest possible to the value that is required for the subsequent synthesis unit. In the case of an FT synthesis, the H2/CO molar ratio will be between 1.1 and 2.2 according to the type of catalyst used.

With an H2/CO molar ratio=1, the molar composition of the gas effluent that is obtained from the POX (8) is typically (in % by volume):

H2: 35-45%
CO: 35-45%
CO2: 10-15%
N2: approximately 5%
Methane: <0.1%
Others (Nitrogen): <5%

The temperature is between 1200° C. and 1600° C., and preferably close to 1400° C., and the pressure is generally between 2.5 MPa and 4 MPa.

The conversion is generally more than 95%, and preferably more than 99%.

The effluent (8) of the PDX is sent to an exchanger (E3) to be cooled to a temperature of between 300° C. and 600° C.

The cooling of the effluent (8) is carried out by exchange on a process fluid (22).

The fluid (22) is preferably high-pressure water (HP) that is evaporated into HP vapor.

A portion of the cooled effluent (9) is sent into a CO conversion unit that modifies the H2/CO ratio by bringing it to the value that is suitable for the application under consideration.

The proportion of the flow (9) is regulated so as to adjust the H2/CO ratio of the fluid (12) to the value required at the input of the FT synthesis stage (not shown in FIG. 1). The effluent (10) of the CO conversion reaction is remixed with the portion (11) of the effluent of the POX that has not undergone the CO conversion reaction so as to produce a dedusted, purified synthesis gas (12) that has the H2/CO molar ratio at the desired value.

Figure 2:
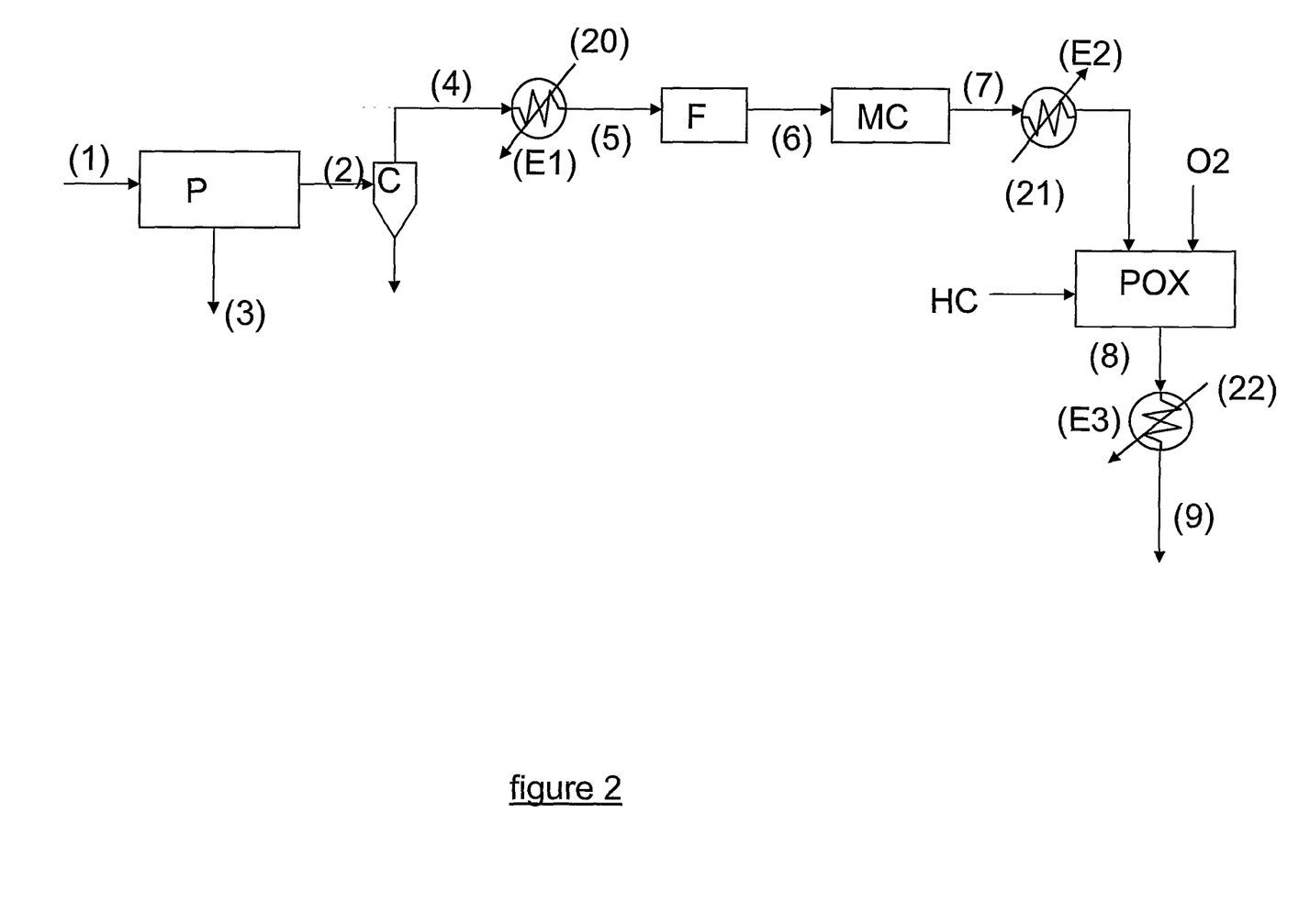
FIG. 2 describes an outline of the process according to a second variant of the process according to the invention. In the second variant, an additional feedstock that consists of a hydrocarbon with an H/C ratio that is greater than that of the biomass is used at the partial oxidation stage so as to modify the ratio of the synthesis gas and to be able to thus eliminate the conversion stage of CO.

Description of the Second Variant of the Process According to the Invention (with Partial Oxidation of an Additional Hydrocarbon, FIG. 2):

The biomass feedstock (1) is assumed to be available with about 10% moisture. It is put under pressure by means of a standard technology (piston, airlock, rotary devices).

The biomass feedstock (1) is introduced into the pyrolysis furnace (P) at a temperature of between 700° C. and 900° C., preferably between 750° C. and 850° C., and under a pressure of about 3 MPa.

The pyrolysis stage produces a gas effluent (2) that represents between 50% and 90% of the biomass that is introduced, and a solid residue (3) that represents the addition.

The gas effluent (2) that is loaded with solid particles is introduced into one or more cyclonic separation stages denoted (C) in FIG. 2.

The dedusted gas effluent (4) is cooled from 800° C. to 500° C. by an indirect exchange with the fluid (20) in an exchanger (E1).

The cooled and dedusted gas effluent (5) is filtered at 500° C., under a pressure of about 3 MPa on a ceramic filter (F), which makes it possible to reduce the content of solid particles in said gas effluent to less than 1 gram per m3 and preferably to less than 0.5 gram per m3 of gas.

The gas after filtration (6) is sent to capture compounds (MC) at 500° C., under 2.9 MPa so as to eliminate the sulfur compounds.

The dedusted and purified gas (7) is heated in an exchanger (E2) with a coolant that can be the process fluid (21).

The partial oxidation stage (POX) is carried out by putting the dedusted and purified pyrolysis gas (7) into contact with a hydrocarbon co-reagent that has an H/C ratio that is more than that of the biomass that is used as a feedstock, and O2 at a degree of purity that is more than 90%, and preferably more than 95%, in a PDX reactor.

The hydrocarbon co-reagent is, for example, purified natural gas, in particular desulfurized natural gas. The flow rate of the additional co-reagent is determined so as to produce the final value of the H2/CO molar ratio that corresponds to the selected application. This H2/CO ratio can be the object of a control loop in which the H2/CO molar ratio will be displayed in terms of a set value, whereby the action variable is the flow rate of additional hydrocarbon.

The technology that is used for the POX reactor is not an element that is characteristic of this invention. It will be possible, for example, to use a gasification reactor or a catalytic POX reactor.

The H2/CO molar ratio at the output of the POX reactor is located between 0.5 and 1.3 depending on the feedstock. This ratio is to be the closest possible to the value required for the subsequent synthesis unit. In the case of an FT synthesis, the H2/CO molar ratio will be between 1.1 and 2.2 according to the type of catalyst used.

With an H2/CO molar ratio=1, the molar composition of the gas effluent that is obtained from the POX (8) is typically (in % by volume):

H2: 35-45%
CO: 35-45%
CO2: 10-15%
N2: approximately 5%
Methane: <0.1%
Others (Nitrogen): <5%

The temperature is between 1200° C. and 1600° C., preferably close to 1400° C., and the pressure is generally between 3 MPa and 2.5 MPa, preferably close to 2.8 MPa. The conversion is generally more than 95%, and preferably more than 99%.

The effluent (8) of the POX is sent to an exchanger (E3) to be cooled to a temperature of between 300° C. and 600° C.

The cooling of the effluent (8) is carried out by exchange on a process fluid (22). The fluid (22) is preferably high-pressure (HP) water that is evaporated into HP vapor.

The cooled effluent (9) has an H2/CO molar ratio that is adjusted to the desired value by means of the HC co-reagent flow rate.

The invention claimed is:

1. A process for the production of a synthesis gas that is purified with a controlled $H_2$/CO molar ratio from lignocellulosic biomass, comprising:
   A) severe pyrolysis at a temperature of between 500° C. and 900° C., producing a gas effluent that is sent to purification, and a solid residue that concentrates the majority of impurities, including alkaline compounds, and a portion of sulfur compounds,
   B) purification of the pyrolysis gas that is obtained from A that consists essentially of a removal of dust from the gas and a capture of sulfur compounds on adsorbent compounds based on ZnO or Co—Mo,
   C) partial oxidation carried out by contact of the feedstock that consists of purified gas obtained from B with oxygen at a purity level of more than 90%, at a reaction temperature of between 1000° C. and 1600° C., and under a pressure of between 2.5 MPa and 4 MPa, whereby said oxidation produces a synthesis gas that comprises carbon monoxide and hydrogen in an $H_2$/CO molar ratio of between 0.5 and 1.5 based on the type of feedstock that is used,
   D) rapid cooling of the synthesis gas that is obtained from C at a temperature of between 300° C. and 500° C.,
   E) carbon-monoxide conversion on a portion of the flow of synthesis gas produced in C of between 30% and 70%, making it possible to attain —after mixing with a portion of the flow that has not undergone the carbon-monoxide conversion —an $H_2$/CO molar ratio that corresponds to a value desired for subsequent use of the synthesis gas.

2. The process for the production of a purified synthesis gas according to claim 1, in which the feedstock of C comprises purified gas that is produced in B that is mixed with an additional hydrocarbon that has an H/C ratio that is more than that of the biomass.

3. The process for the production of a purified synthesis gas according to claim 2, in which the additional hydrocarbon that is introduced during the partial oxidation is purified natural gas.

4. The process for the production of a purified synthesis gas according to claim 2, in which the additional hydrocarbon flow that is added as a co-reagent in the partial oxidation makes it possible to monitor the value of the $H_2$/CO molar ratio of the synthesis gas that is obtained.

5. The process for the production of a purified synthesis gas according to claim 1, further comprising subjecting said gas to FT synthesis on a catalyst with iron said gas having a CO/$H_2$ ratio of between 1.1 and 1.3.

6. The process for the production of a purified synthesis gas according to claim 1, further comprising subjecting said gas to FT synthesis on catalyst with cobalt, said gas having a CO/$H_2$ ratio of between 2.0 and 2.3.

7. The process for the production of a purified synthesis gas according to claim 1, further comprising subjecting said gas to synthesis of methanol or dimethyl ether, said gas having an $H_2$/(CO +$CO_2$) ratio of between 1.7 and 2.3, with less than 10 mol% of $CO_2$.

8. The process for the production of a purified synthesis gas according to claim 1, in which the heat that is necessary for pyrolysis is provided at least in part by combustion of pyrolysis solid.

9. The process for the production of a purified synthesis gas according to claim 1, in which cooling of the synthesis gas at the output of the partial oxidation stage is carried out by indirect heat exchange with the biomass, further providing a portion of heat that is necessary for the pyrolysis.

10. The process for the production of a purified synthesis gas from biomass according to claim 1, wherein pyrolysis of the biomass is preceded by a pretreatment by drying at a temperature of between 150° C. and 280° C.

11. The process for the production of a purified synthesis gas from biomass according to claim 1, in which capture of the sulfur compounds during the purification is carried out on capture compounds based on ZnO or Co—Mo that are used in the form of filtration beds so as to carry out simultaneously the filtration of solid particles that are contained in the gas.

12. A process for the production of a synthesis gas that is purified with a controlled $H_2/CO$ molar ratio from lignocellulosic biomass, comprising:
- A) severe pyrolysis at a temperature of between 500° C. and 900° C., producing a gas effluent that is sent to purification, and a solid residue that concentrates the majority of impurities, including alkaline compounds, and a portion of sulfur compounds,
- B) purification of the pyrolysis gas that is obtained from A that consists essentially of a removal of dust from the gas and a capture of sulfur compounds on adsorbent compounds based on ZnO or Co—Mo,
- C) partial oxidation carried out by contact of the feedstock that consists of purified gas obtained from B with oxygen at a purity level of more than 90%, at a reaction temperature of between 1000° C. and 1600° C., and under a pressure of between 2.5 MPa and 4 MPa, whereby said oxidation produces a synthesis gas that comprises carbon monoxide and hydrogen in an $H_2/CO$ molar ratio of between 0.5 and 1.5 based on the type of feedstock that is used,
- D) rapid cooling of the synthesis gas that is obtained from C at a temperature of between 300° C. and 500° C.,
- E) carbon-monoxide conversion on a portion of the flow of synthesis gas produced in C of between 30% and 70%, making it possible to attain —after mixing with a portion of the flow that has not undergone the carbon-monoxide conversion —an $H_2/CO$ molar ratio that corresponds to a value desired for subsequent use of the synthesis gas, further comprising subjecting the synthesis gas to FT synthesis on a catalyst comprising iron or cobalt, said synthesis gas having a $CO/H_2$ ratio of 1.1-1.3 where iron is the catalyst and 2.0-2.3 where cobalt is the catalyst.

* * * * *

UNITED STATES PATENT AND TRADEMARK OFFICE
CERTIFICATE OF CORRECTION

PATENT NO. : 8,409,545 B2
APPLICATION NO. : 12/524510
DATED : April 2, 2013
INVENTOR(S) : Rolland et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this
First Day of September, 2015

Michelle K. Lee
*Director of the United States Patent and Trademark Office*